US006892194B2

(12) United States Patent
McClanahan

(10) Patent No.: US 6,892,194 B2
(45) Date of Patent: May 10, 2005

(54) SYSTEM AND METHOD FOR ORGANIZING COLOR VALUES USING AN ARTIFICIAL INTELLIGENCE BASED CLUSTER MODEL

(75) Inventor: Craig J. McClanahan, Bowling Green, OH (US)

(73) Assignee: BASF Corporation, Southfield, MI (US)

( * ) Notice: Subject to any disclaimer, the term of this patent is extended or adjusted under 35 U.S.C. 154(b) by 706 days.

(21) Appl. No.: 09/874,697

(22) Filed: Jun. 5, 2001

(65) Prior Publication Data

US 2002/0184171 A1 Dec. 5, 2002

(51) Int. Cl.[7] .............................................. G06F 15/18
(52) U.S. Cl. ...................................... 706/20; 706/18
(58) Field of Search ..................................... 706/18–20

(56) References Cited

U.S. PATENT DOCUMENTS

| | | | | |
|---|---|---|---|---|
| 5,410,637 A | * | 4/1995 | Kern et al. ..................... | 706/52 |
| 5,546,195 A | * | 8/1996 | Arai ............................ | 358/518 |
| 5,559,604 A | * | 9/1996 | Arai ............................ | 356/402 |
| 5,579,031 A | * | 11/1996 | Liang ........................... | 345/604 |
| 5,680,333 A | * | 10/1997 | Jansson ......................... | 703/6 |
| 5,687,000 A | * | 11/1997 | Nakaoka ....................... | 358/296 |
| 5,729,360 A | | 3/1998 | Kita et al. .................... | 358/500 |
| 5,761,070 A | * | 6/1998 | Conners et al. ............. | 700/223 |
| 5,771,311 A | * | 6/1998 | Arai ............................ | 382/162 |
| 5,774,230 A | * | 6/1998 | Goto ............................ | 382/162 |
| 5,798,943 A | * | 8/1998 | Cook et al. .................. | 382/162 |
| 5,864,834 A | * | 1/1999 | Arai ............................ | 706/16 |
| 5,899,605 A | * | 5/1999 | Caruthers et al. ............ | 399/223 |
| 5,929,906 A | * | 7/1999 | Arai et al. ................. | 348/223.1 |
| 6,088,475 A | | 7/2000 | Nagashima et al. ........ | 382/162 |

FOREIGN PATENT DOCUMENTS

| | | | | |
|---|---|---|---|---|
| EP | 484-564 | * | 11/1990 | |
| EP | 484 564 | | 11/1990 | ............. G01J/3/46 |
| GB | 1056358 | * | 10/1963 | |
| WO | WO 94/14039 | * | 6/1994 | |
| WO | WO 98/12520 | * | 3/1998 | |
| WO | WO 99/01982 | * | 1/1999 | |
| WO | WO 00/65847 | | 2/2000 | |
| WO | WO 00/65847 | * | 11/2000 | |

OTHER PUBLICATIONS

BASF Corporation, et al. International Search Report PCT/US02/14091 Internationa Filing Date Mar. 5, 2002.*
BASF Corporation, et al. International Search Report PCT/US02/14092 Internationa Filing Date Mar. 5, 2002.*
Characterization of a Nueral Network–Based Trajectory Recognition Optical Sensor for an Automated Guided Vehicle, G.A. Borges, A.M.N. Lima and G.S. Deep, IEEE Instrumentation and Measurement Technology Conference, (Maqy 1998).*
Evolving Color Recipes, Eiji Mizutani, Hideyuki Takagi, David M. Auslander, Jyh–Shing Roger Jang, IEEE Transactions on Systems, Man, and Cybernetics–Part C: Applications and Review, vol. 30, No. 4, (Nov. 2000).*

* cited by examiner

Primary Examiner—Anthony Knight
Assistant Examiner—Michael B. Holmes

(57) ABSTRACT

A system and method for organizing a plurality of sets color values into a plurality of color groups, such as paint, pigments, or dye formulations, is provided. The inputs to the system are the color values of a proposed paint, dye or colorant formulation and color measurement angles. The system includes an input device for entering a plurality of sets of color values and an artificial intelligence cluster model coupled to the input device. The cluster model produces an output signal indicative of the one color group to which a set of color values belongs. The artificial intelligence model may be embodied in a neural network. More specifically, the cluster model may be a self-organizing map neural network.

61 Claims, 4 Drawing Sheets

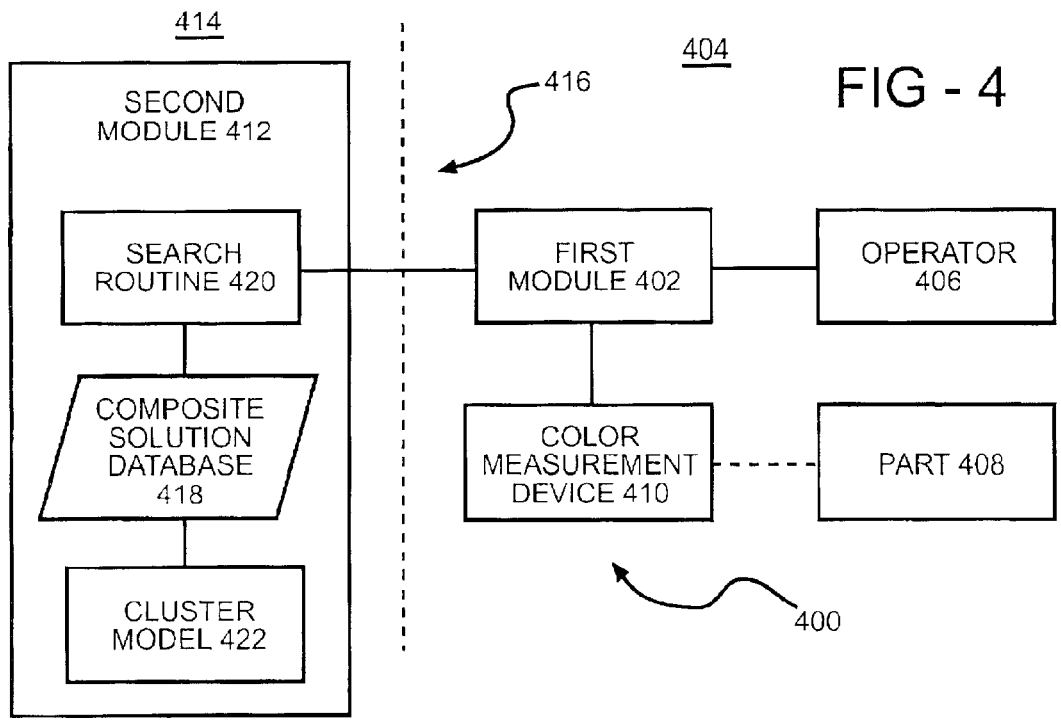
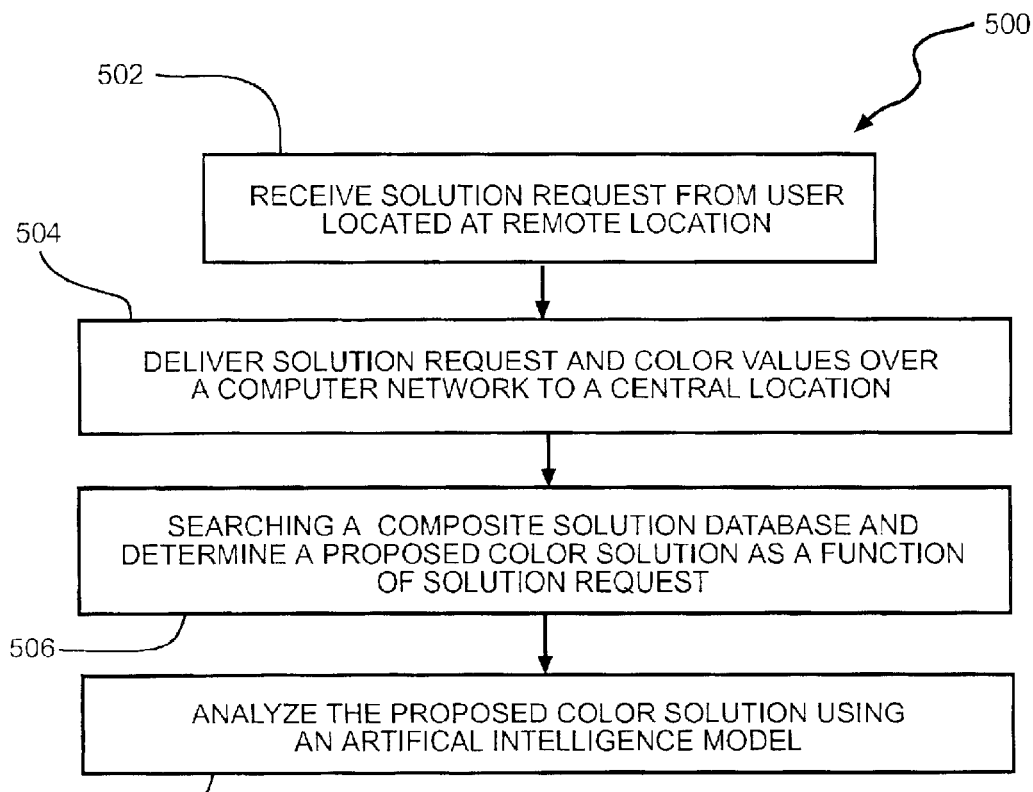

SYSTEM AND METHOD FOR ORGANIZING COLOR VALUES USING AN ARTIFICIAL INTELLIGENCE BASED CLUSTER MODEL

BACKGROUND OF THE INVENTION

1. Field of the Invention

The present invention relates generally to organizing color values, and more particularly, to a method and system for organizing color values using artificial intelligence.

2. Description of the Prior Art

Products today are offered to consumers in a wide variety of colors. Consumer products may be colored by means of colorants, dye or paint. Color matching is required in a variety of areas, including textiles, plastics, various synthetic materials, prosthetics, dental applications, and paint applications, due to the many variations in color, due to the wide variations in shades and hues of any given color and color variations in an article. The actual color produced in a given article may vary due to a number of factors. For example, textile colors vary according to fiber composition. Colorants for plastic vary according to the plastic composition. Painted articles vary in color depending on any number of factors, such as paint composition, variations in the paint application process, including application method, film thickness, drying technique and number of layers. An important application for color matching is in the area of automotive color matching. Frequent uses for color matching in automotive paint occur in matching the same color from different batches or matching similar colors from different manufacturers. Additionally, there is a requirement for color matching refinish paint to an OEM (original equipment manufacture) color when a vehicle body panels are damaged and require repainting.

A paint manufacturer supplies one or more paint formulations for the original paint color to refinish paint shops. By supplying a plurality of formulations or variants for a particular color, the paint manufacturer accounts for those factors which affect the actual color. Matching of dyes or colorants for other applications is also done through formulations for a particular color. Typically, the formulations for a particular color are distributed on paper, microfiche, and/or compact disks (CD). A color tool, composed of swatches of the variants for each color may also be produced and delivered to each customer. The customer must select a formulation most closely matching the existing color of the article. This is typically done visually, i.e., by comparing swatches of paint or color to the part or in the case of paint, spraying a test piece with each formulation.

Different formulations are derived from actual data gathered by inspectors at various locations, e.g., the textile, plastic or automobile manufacturer or vehicle distribution point. The inspectors take color measurement readings from articles of a particular color. These readings are used to develop color solutions, i.e., different formulations for the same color.

There are several disadvantages to the present method of color matching. Conventional color laboratories that use human analysis to determine color matching require significant numbers of people, equipment and materials for identifying pigments and locating a close match from a database. In some cases, an existing formula may provide a close match. In other cases, the formula must be adjusted, mixed, applied and compared to a standard. These steps are repeated until a suitably close match is found. In other cases, no match is found and a formula must be developed from scratch. Correction of the formula requires a highly skilled technician proficient in the interaction of light with several different pigments.

Moreover, traditional computer software that assists a technician has several disadvantages. Traditional computer software has not proven to be very effective on colors containing "effect pigments." This software is typically based on a physical model of the interaction between illuminating light and the colorant or coating. These models involve complex physics and do not account for all aspects of the phenomena. A traditional approach is to use a model based on the work of Kubleka-Munk or modifications thereof. The model is difficult to employ with data obtained from multi-angle color measuring devices. One particular difficulty is handling specular reflection that occurs near the gloss angle. Another deficiency of the Kubleka-Munk based models is that only binary or ternary pigment mixtures are used to obtain the constants of the model. Thus, the model may not properly account for the complexities of the multiple interactions prevalent in many paint, dye or colorant recipes.

SUMMARY OF THE INVENTION AND ADVANTAGES

A color may be expressed as color values such as $L^*$, $C^*$, $h$ or $L^*$, $a^*$, $b^*$. These color values are typically determined by measuring the color with a color measuring device. Accordingly, color samples may be organized according to their color values into color groups. Historically, these values have been determined and sorted manually, i.e., by visual evaluation. The color values for a particular formulation representing a color group are determined as a function of all of the color measurement values which have been deemed to belong to that color group (usually by visible methods).

In one aspect of the present invention, a system for organizing sets of color values into a plurality of color groups is provided. The model is embodied in a neural network and, in particular, a self-organizing map neural network. The neural network is trained using the color values for each formulation of each color sample and the measurement angles that the color values are derived from using a color measurement device. The neural network organizes the sets of color values into color groups.

The number of color groups may be determined by the system or input into the system or any other suitable method of determining the number of groups necessary. In addition, this number may be changed following an iteration of organizing the sets into color groups. The change in the number of groups may be determined by the system, input into the system, or determined through the use of fuzzy logic.

The neural network includes an input layer having nodes for receiving input data related to color values. Weighted connections connect to the nodes of the input layer and have coefficients for weighting the input data. An output layer having nodes is either directly or indirectly connected to the weighted connections. The output layer generates output data that is related to the color groups. The data of the input layer and the data from the output layer are interrelated through the neural network's nonlinear relationship.

Neural networks have several advantages over conventional logic-based expert systems or computational schemes. Neural networks are adaptive and provide parallel computing. Further, because neural responses are non-linear, a neural network is a non-linear device, which is critical when applied to nonlinear problems. Moreover, systems incorporating neural networks are fault tolerant because the information is distributed throughout the network. Thus, system performance is not catastrophically impaired if a processor experiences a fault.

Another aspect of the present invention provides a system and a method for organizing color values into color groups using an artificial intelligence cluster model which can be used to assist in providing color matching solutions to a customer over a computer network. The system includes a first module located at a remote location. The first module receives a solution request from an operator. A second module is coupled to the first module via a computer network. The second module is located at a central location and includes a composite solution database, an artificial intelligence tolerance model and a search routine coupled to the composite solution database. The second module is adapted to receive the solution request from the first module and to provide a proposed color solution as a function of the solution request. The artificial intelligence cluster model is used to analyze the proposed color solution.

The method includes the steps of receiving a solution request and color values from an operator located at a remote location, delivering the solution request and color values from the remote location to a central location over the computer network, selecting a color group as a function of the solution request and providing a proposed color solution. An artificial intelligence cluster model is used to analyze the proposed color solution.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a block diagram of a color management and solution distribution system, according to an embodiment of the present invention;

FIG. 5 is a flow diagram of a color management and solution distribution method, according to an embodiment of the present invention.

DETAILED DESCRIPTION OF THE PREFERRED EMBODIMENT

Referring to the Figures., wherein like numerals indicate like or corresponding parts throughout the several views, a system 100 and method 300 for organizing a plurality of sets of color values into a plurality of color groups is provided. For example, the color values are associated with a paint formulation to be used in the repair of an automobile body panel. The inputs to the system include a plurality of color values (see below) which may be associated with a proposed paint formulation and color measurement angles from the color measurement device. The inputs to the system 100 may include the number of color groups into which the sets of color values are organized, color value tolerances, or any other suitable inputs.

Figure 1:
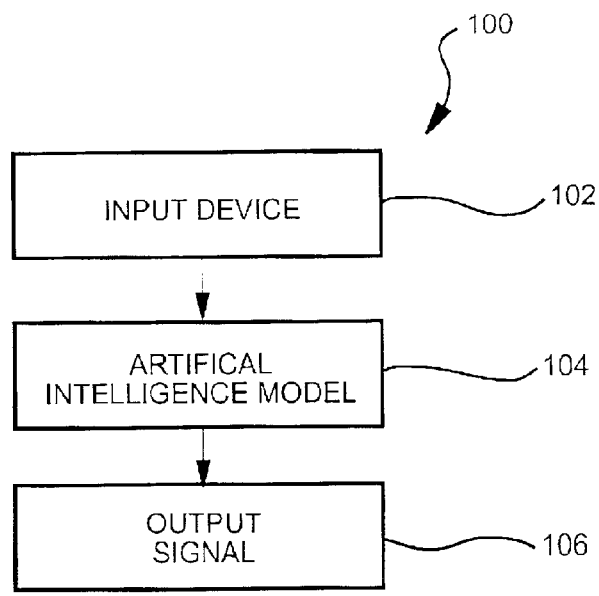
FIG. 1 is a block diagram of a system for matching an input set of color values to a color groups using an artificial intelligence model, according to an embodiment of the present invention.

With specific reference to FIG. 1, the system 100 includes an input device 102 for entering a proposed color solution. Preferably, the system 100 is embodied in a computer program run on a general purpose computer (not shown). The input device 102 may be embodied in a user interface for inputting sets of color values, such as a keyboard, mouse and/or graphical user interface. Furthermore, the input device 102 may be embodied in an element of a computer system so as to receive the sets of color values as input from another element of the computer system, such as a computer database, an electronic mail file or other suitable element of the computer system (see below). Furthermore, the number of color groups may be determined by one of these elements of the system 104. The number of color groups may be changed according to how the sets of color values are organized into color groups, according to color value tolerances, using fuzzy logic (see below) or any other suitable method of determining a new number of color groups.

A set of color values input includes color measurement data in the form of color values. Color measurement data is an indication of the actual color of an object. Preferably, the color measurement data may be determined using a spectrophotometer, a spherical geometry color measuring device, a digital camera or other suitable device.

Color values refer to color attributes used to quantify color. The color values may include color space values, reflectance values or other suitable color attributes. One example of color space values are defined by $L^*$, $a^*$, and $b^*$, where $L^*$ represents luminous intensity, $a^*$ represents a red/green appearance, $b^*$ represents a yellow/blue appearance. Another example of color space values are defined by $L^*$, $C^*$, h, where $L^*$ represents lightness, $C^*$ represents chroma, and h represents hue. The color values ($L^*$, $a^*$, and $b^*$ or $L^*$, $C^*$, and h) at various angles are obtained using a color measurement device.

A fuzzy variable set is the basis for a mathematical system of fuzzy logic. "Fuzzy" refers to the uncertainty inherent in nearly all data. Fuzzy logic may be used in artificial intelligence models, specifically neural networks, because there is a fuzziness in the output of the neural network. Fuzzy logic is based on fuzzy variables.

The system 100 of the present invention further includes an artificial intelligence cluster model 104 coupled to the input device 102. The cluster model 104 produces an output signal 106. The output signal 106 may be embodied in various formats. The format of the output signal 106 may be indicative of the color group to which a set of color values belongs, a formulation representing the color group to which a set of color values belongs, or any other suitable format.

The artificial intelligence cluster model 104 uses an iterative process to organize the plurality of sets into the plurality of color groups. In addition, the system 100 may remove one of the plurality of color groups having less than a minimum of sets of color values.

The artificial intelligence cluster model 104 of the subject invention is preferably embodied in a neural network. More specifically, the cluster model 104 may be a self-organizing map neural network or any other suitable neural network.

Figure 2:
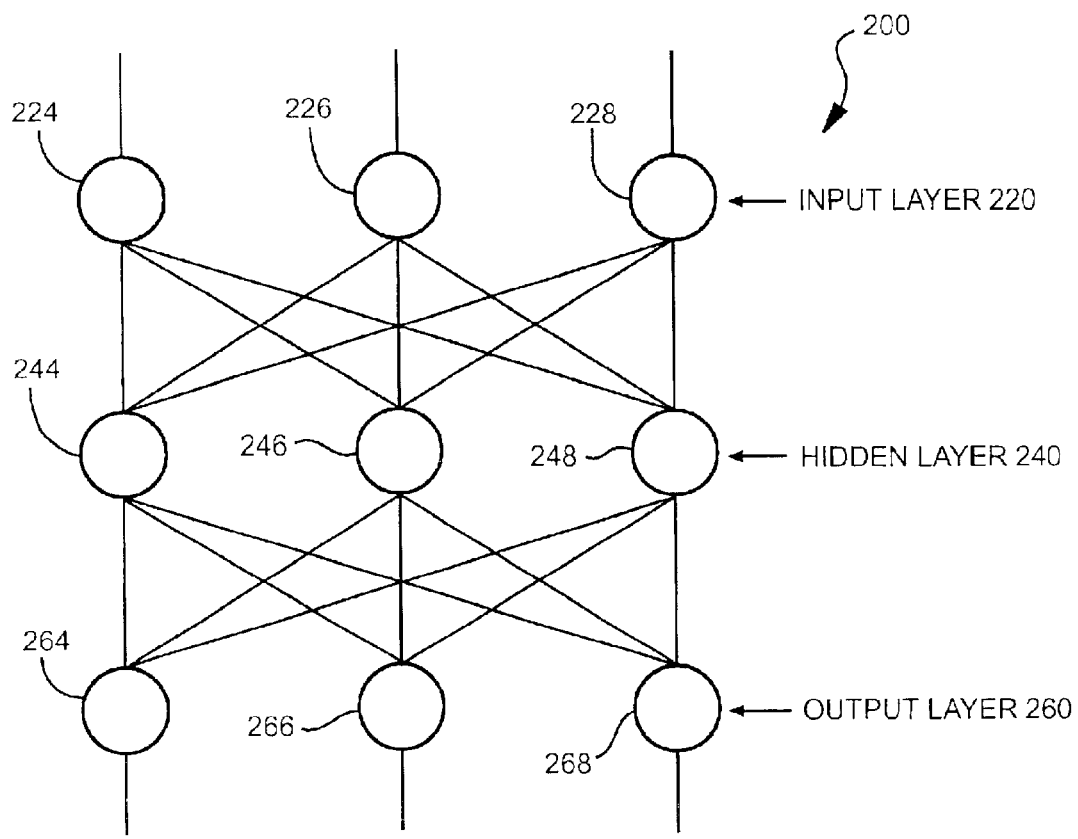
FIG. 2 is a diagram depicting a neural network for use in the artificial intelligence model of FIG. 1, according to an embodiment of the present invention.

Referring to FIG. 2, an artificial neural network is generally shown at 200. Artificial neural networks 200 are computing systems that model vertebrate brain structure and processes. Artificial neural network techniques are a member of a group of methods which fall under the umbrella of artificial intelligence. Artificial intelligence is commonly associated with logic rule-based expert systems where the rule hierarchies used are reasoned from human knowledge. In contrast, artificial neural networks 200 are self-trained based on experience acquired through data compilation and computation. Thus, artificial intelligence utilizing neural networks 200 is particularly useful in conjunction with complex systems or phenomena where the analysis is complicated, and deriving a model from human knowledge for use in a conventional expert system is a daunting task.

Although neural networks differ in geometry, activation function and training mechanics, they are typically organized into at least three layers. The first layer is an input layer 220 having one or more input nodes 224, 226, 228. The second layer is an output layer 260 having one or more output nodes 264, 266, 268. Each output node 264, 266, 268 corresponds with an input node 224, 226, 228. Between the inner and outer layers, there are one or more hidden layers 240, each having one or more hidden nodes 244, 246, 248 corresponding to an input node and output node pair 224, 264, 226, 266, 228, 268. Each input variable is associated with an input node 224, 226, 228 and each output variable is associated with an output node 264, 266, 268. Within the neural network 200, data flows in only one direction, such that each node 224, 226, 228, 244, 246, 248, 264, 266, 268 only sends a signal to one or more nodes and receives no feedback.

The enabling power of a neural network 200 is its connectivity, or the connections between the various nodes 224, 226, 228, 244, 246, 248, 264, 266, 268. (A configuration technique modeled after the structure of the human brain.) Moreover, because the network is structured, or connected, in such a way as to provide parallel processing (where each node 224, 226, 228, 244, 246, 248, 264, 266, 268 has connections with other nodes 224, 226, 228, 244, 246, 248, 264, 266, 268), it is extremely efficient at acquiring and storing experiential knowledge and then, recalling and using that knowledge. More specifically, a node 224, 226, 228, 244, 246, 248, 264, 266, 268 receives input values, processes the input values and provides an output. The processing step includes summing the inputs, adding a bias value and submitting this total input to an activation function which limits the magnitude of the output. The connections between the various nodes 224, 226, 228, 244, 246, 248, 264, 266, 268 are weighted. An output sent from one node 224, 226, 228, 244, 246, 248, 264, 266, 268 to another is multiplied by the weighting factor associated between those two particular nodes 224, 226, 228, 244, 246, 248, 264, 266, 268. The weighting factor represents the knowledge of the system. The system continues to accumulate knowledge and adjust the weighting factor in accordance with training and the further acquisition of knowledge by the network 200. Consequently, the output of the network 200 agrees with the experience of the network 200.

Figure 3:
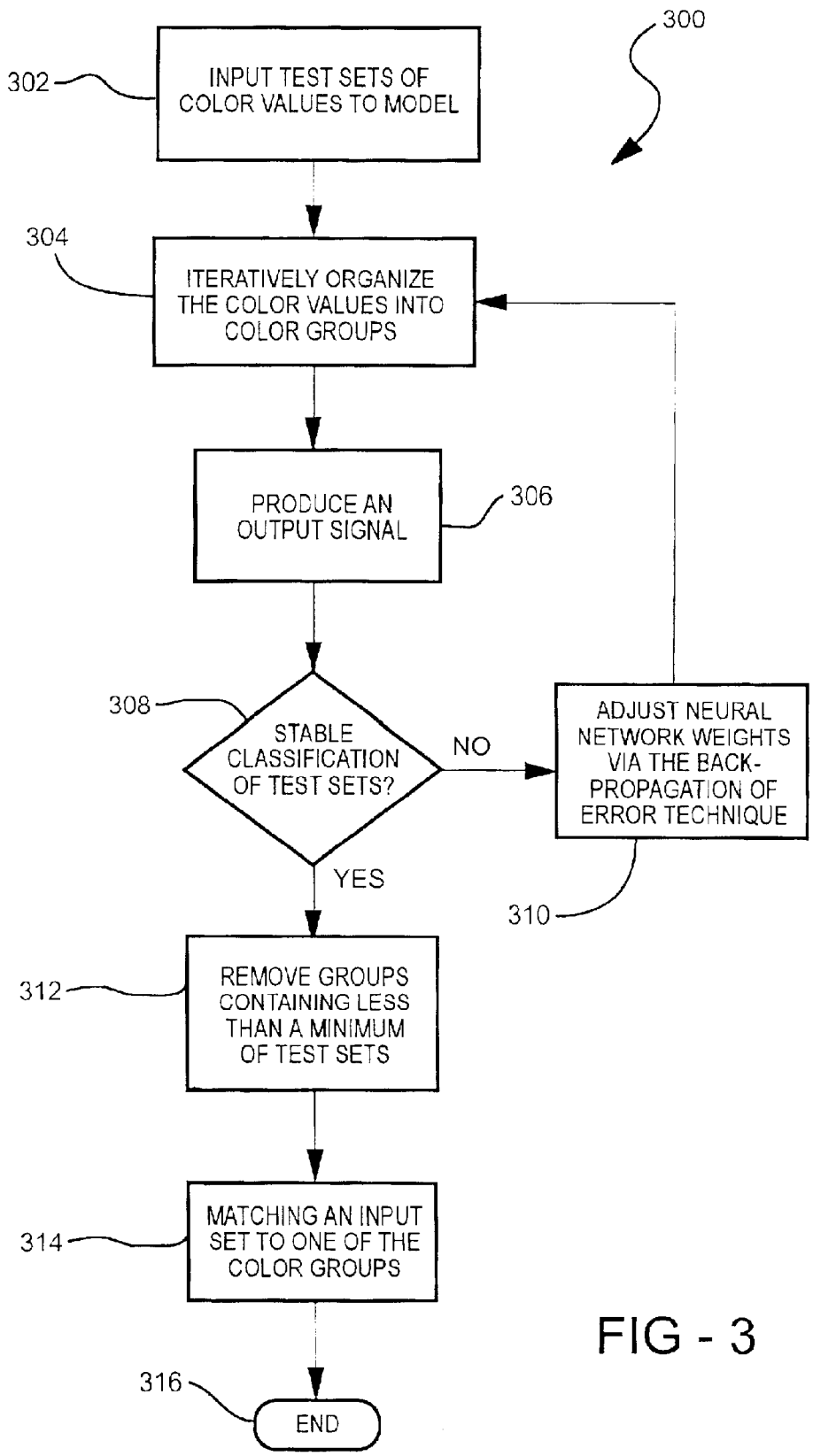
FIG. 3 is a block diagram depicting the training of the color cluster neural network of FIG. 2, according to an embodiment of the present invention.

With particular reference to FIG. 3, the neural network 104 of the subject invention is self-trained using sets of test color values for the subject color. There are two different types of training (learning) for a neural network 104. In supervised training (or external training), the network 104 is taught to match its output to external targets using data having input and output pairs. In supervised training, the weighting factors are typically modified using a back-propagation method of learning where the output error is propagated back through the network 104. In unsupervised training (or internal training), the input objects are mapped to an output space according to an internal criteria. There are no expected outputs presented in unsupervised training. Instead, the network 104, by its self-organizing properties, is able to infer relationships and learn more as more inputs are presented to it. An advantage of this scheme is that the network 104 can be expected to change with changing conditions and inputs. An example of a neural network 104 using unsupervised training is a self-organizing map neural network. The self-organizing map neural network 104 uses a winner-take-all strategy. Inputs are provided into each of the input nodes 224, 226, 228 and a weighted factor associated with the connection 244, 246, 248 between the input node 244, 246, 248 and a corresponding output node 264, 266, 268 is applied to the input to determine an output. The weighted factors and inputs are normalized such that an output parameter is associated with the output node 264, 266, 268 and ranges in value from 0 to 1. The output node 264, 266, 268 having the largest output parameter is the winner and, in turn, outputs its output signal.

Referring to FIG. 3, another aspect of subject invention provides a method 300 for organizing a plurality of color groups based on a plurality of test sets of color values. The system 300 includes a neural network 104. The neural network 104 of the subject invention is a self-organizing map neural network. In a first process block 302, the plurality of test sets of color values are input. The number of color groups is determined by determining differential color values between each color value set and all other color value sets. In a second process block 304, the network 104 is adapted for associating each color group with an output node 264, 266, 268 in the output layer 260 of the neural network 104. In the second process block 304, the neural network 104 organizes each of the test sets of color values into one of the color groups using the weighted factors of the connections 244, 246, 248. In a first decision block 308, the stability of the classification of the color sets by the neural network 104 is determined.

Stability of the classification of color sets is provided after inputting the test sets into the neural network 104 through several iterations and adjusting the weighted factors accordingly. Stability is achieved when each of the test sets is repetitiously sorted to the same corresponding color group following each iteration.

In a fourth process block 310, if the classification of the color sets is determined not to be stable, then the weighted factors associated with each connection are adjusted. The weighted factors may be adjusted externally by a system user or internally by an element of the system 100. If the classification of color sets is determined to be stable, then the model is trained.

In a fifth process block 312, another aspect of the present invention provides that any color group having less than a minimum number of color value sets is removed from the color groups to which input sets of color values may be matched. The network may then be retrained with a reduced number of color groups. In a sixth process block 314, the model 104 matches an input set of color values to one the plurality of color groups.

With reference to FIG. 4, another embodiment of the present invention provides a computer system 400 for managing and providing color solutions, such as paint, pigments or dye formulations. The system 400 includes a first module 402 located at a remote location 404, such as a customer site. Preferably, the first module 402 is implemented on a computer (not shown), such as a personal computer or wireless computing device. The first module 402 is adapted to be operated by a user or operator 406, i.e., the customer. The operator 406 inputs a solution request to the first module 402. The solution request includes a paint identifier or color code which identifies the paint or color of a subject sample 408, and color measurements from a color measurement device 410. The sample may be a painted substrate or any other painted or colored sample.

The color measurement device 410 is used to provide color measurements, i.e., an indication of the actual color of the subject sample 408. Preferably, the color measurement device 410 is a spectrophotometer such as is available from X-Rite, Incorporated of Grandville, Mich. as model no. MA58. Alternatively, the color measurement device 410 may be a spherical geometry color measuring device, a digital camera or other suitable device.

The first module 402 is coupled to a second computer based module 412 located at a central location 414, such as the paint manufacturer's facility. The first and second computer based modules 402, 412 are coupled across a computer network 416. In the preferred embodiment, the computer network 416 is the internet.

The second module 412 receives the solution request from the operator 406 via the first module 402 and the computer network 416. The second module 412 includes a composite solution database 418, a search engine or routine 420, and an artificial intelligence cluster model 422. The search routine 420 is adapted to receive the solution request from the first module 402 and to provide a proposed color solution as a function of the solution request. The artificial intelligence cluster model 422 is used to analyze the proposed color solution.

In one embodiment, the proposed color solution is chosen from a plurality of color solutions and the artificial intelligence cluster model is adapted to determine if a new color solution is required.

In another embodiment, the artificial intelligence cluster model is adapted to determine if a new color solution should be published on another media, such as a color wheel.

In one more embodiment, the artificial intelligence cluster model is adapted to determine if additional color samples are required, e.g., additional field samples in order to determine additional color solutions.

In still another embodiment, the search routine 420 uses the artificial intelligence cluster model 422 for determining the proposed color solution. The model 422 includes a plurality of color groups and a formulation associated with each color group. The artificial intelligence model 422 is adapted to select one of the plurality of color groups as a function of the solution request. The search routine 420 is adapted for providing the proposed color solution as a function of the formulation associated with the one color group.

With reference to FIG. 5, a computer based method 500 for providing color solutions to a customer will now be explained. In a seventh control block 502, color values and, the solution request from the operator 406 located at the remote location 404 is received. In an eighth control block 504, the solution request and color values are delivered over the computer network 416 from the remote location 404 to the central location 404. In a ninth control block 506, a composite solution database is searched and a proposed color solution is determined as a function of the solution request. In a tenth control block 506, the proposed color solution is analyzed using an artificial intelligence cluster model. Preferably, the proposed color solution is selected from a plurality of color solutions.

In one embodiment, the step of analyzing the proposed color solution includes the step of using the artificial intelligence cluster model to determine if a new color solution is required.

In another embodiment, the step of analyzing the proposed color solution includes the step of using the artificial intelligence cluster model to determine if a new color solution should be published on another media.

In still one more embodiment, the step of analyzing the proposed color solution includes the step of using the artificial intelligence cluster model to determine is additional color samples are required.

In even one more embodiment, the artificial intelligence cluster model includes a plurality of color groups and a formulation associated with each color. The method includes the steps of using the artificial intelligence cluster model to select one of the plurality of color groups as a function of the solution request and providing the proposed color solution as a function of a formulation associated with the one color group.

Figure 6:
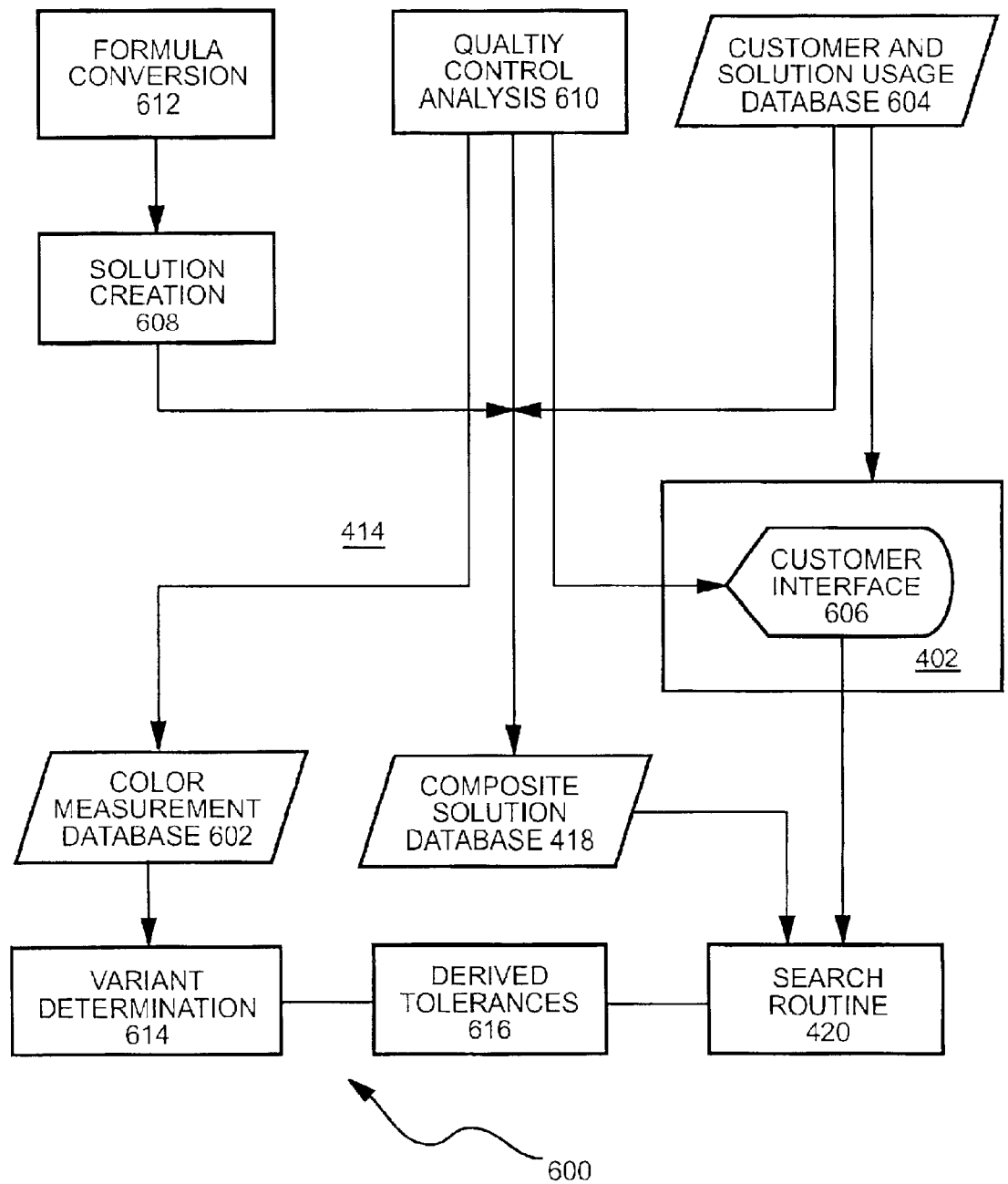
FIG. 6 is a block diagram of a color management and solution distribution method, according to another embodiment of the present invention.

With particular reference to FIG. 6, a system 600 for managing and providing color solutions for publishing using a variant determination process 614 is provided. The system 600 includes three databases: the composite solution database 418, a color measurement database 602, and a customer and solution usage database 604.

A customer interface 606 is implemented on the first module 402 located at the remote location 604. The customer interface 606 allows the operator 406 to log on to the system, communicate with the system 400,600, e.g., to request color solutions, to communicate color values and color measurement data, and to receive color solutions from the system 400,600. The customer interface 606 is graphical in nature, and, preferably, is accessed through a generic world wide web (WWW) browser, such as Microsoft™ Internet Explorer, available from Microsoft of Redmond, Wash.

The customer interface 606 may be implemented in hyper text markup language (HTML), the JAVA language, and may include JavaScript. The system 600 also includes several processes: a solution creation process 608, a quality control process 610, a formula conversion process 612, a variant determination process 614, and a derived tolerance process 616.

Referring to FIGS. 1 and 2, the artificial intelligence cluster model 100 of the subject invention is embodied in a neural network 104. The cluster model neural network 104 receives an input set of color values. The artificial intelligence cluster model 104 matches the input set of color values with one of a plurality of color groups to analyze a proposed color solution and/or provide a proposed color solution (see above).

Specifically, the subject invention neural network 104, 200 includes an input layer 220 having a plurality of input nodes 224, 226, 228 for receiving a plurality of color values. The subject invention neural network 104, 200 further includes an output layer 260 having a plurality of output nodes 264, 266, 268 for providing a selected color group which may have an associated formulation, wherein one of the plurality of input nodes 224, 226, 228 corresponds with one of the plurality of output nodes 264, 266, 268. The subject invention neural network 206 further includes a plurality of connections 240, each having a plurality of weighted factor 244, 246, 248 wherein one of the plurality of weighted factor 244, 246, 248 corresponds to one of the plurality of input nodes 224, 226, 228 and the corresponding one of the plurality of output nodes 264, 266, 268. The plurality of weighted factors non-linearly determine to which color group a set of color values belongs.

What is claimed is:

1. A computer-based system for organizing a plurality of sets of color values, comprising:
   an input device being adapted to receive the plurality of sets of color values; and,
   an artificial intelligence cluster model coupled to the input device and being adapted to organize the plurality of sets into a plurality of color groups as a function of the plurality of sets of color values, each color group containing one or more sets of color values and being associated with a color formulation.

2. A computer-based system, as set forth in claim 1, wherein the artificial intelligence cluster model uses an iterative process to organize the plurality of sets into the plurality of color groups.

3. A computer-based system, as set forth in claim 1, wherein the input device is adapted to receive a number of color groups input signal for determining the plurality of color groups.

4. A computer-based system, as set forth in claim 3, wherein the number of color groups input signal is calculated.

5. A computer-based system for organizing a plurality of sets of color values, comprising:
   an input device being adapted to receive the plurality of sets of color values; and,
   an artificial intelligence cluster model coupled to the input device and being adapted to organize the plurality of sets into a plurality of color groups as a function of the plurality of sets of color values, wherein one of the plurality of color groups having less than a minimum of sets of color values is removed.

6. A computer-based system, as set forth in claim 1, wherein the artificial intelligence cluster model is a neural network.

7. A computer-based system, as set forth in claim 6, wherein the neural network is a self-organizing map neural network.

8. A computer-based system for matching an input set of color values with one of a plurality of color groups, comprising:
   an input device being adapted to receive the input set of color values; and,
   an artificial intelligence cluster model coupled to the input device and being adapted to select the one of the plurality of color groups as a function of the input set of color values, each color group having one or more sets of color groups associated with a color formulation.

9. A computer-based system, as set forth in claim 8, wherein the artificial intelligence model is adapted to organize the plurality of color groups based on a plurality of test sets of color values.

10. A computer-based system, as set forth in claim 8, wherein the artificial intelligence cluster model is a neural network.

11. A computer-based system, as set forth in claim 10, wherein the neural network is a self-organizing map neural network.

12. A computer-based system, as set forth in claim 10, wherein the neural network includes an input layer having a plurality of input nodes for receiving the plurality of sets and an output layer coupled to the input layer and having a plurality of output nodes, wherein one of the plurality of input nodes corresponds to one of the plurality of the output nodes.

13. A computer-based system, as set forth in claim 12, including a plurality of connections for connecting one of the plurality of output nodes to one of the plurality of input nodes.

14. A computer-based system, as set forth in claim 13, including a weighted factor associated with each of the plurality of connection for selecting one of the plurality of color groups as a function of one of the plurality of sets.

15. A computer-based system, as set forth in claim 14, including an output signal output by the output layer.

16. An artificial intelligence model, as set forth in claim 15, wherein the output signal is indicative of the one of the plurality color groups.

17. An artificial intelligence model, as set forth in claim 15, wherein each color group is associated with a formulation.

18. An artificial intelligence model, as set forth in claim 17, wherein the output signal is the formulation.

19. A computer-based system, as set forth in claim 15, wherein the weighted factor is adjusted as a function of the output signal.

20. An artificial intelligence cluster model for organizing a plurality of sets of color values, comprising:
   an input layer having a plurality of input nodes and being adapted for receiving the plurality of sets of color values; and
   an output layer coupled to the input layer and having a plurality of output nodes wherein one of the plurality of output nodes corresponds with one of the plurality of input nodes;
   wherein the artificial intelligence cluster model is adapted to organize the plurality of sets of color values into a plurality of color groups as a function of the plurality of sets of color values, each color group having an associated color formulation.

21. An artificial intelligence cluster model, as set forth in claim 20, wherein the model is a neural network.

22. An artificial intelligence model, as set forth in claim 21, wherein the neural network is a self-organizing map neural network.

23. An artificial intelligence cluster model for matching an input set of color values with one of a plurality of color groups, each color group containing one or more sets of color value and being associated with a color formulation, comprising:
   an input layer having a plurality of input nodes and being adapted for receiving the input set of color values; and
   an output layer coupled to the input layer and having a plurality of output nodes wherein one of the plurality of output nodes corresponds with one of the plurality of input nodes;
   wherein the artificial intelligence cluster model is adapted to select the one of a plurality of color groups as a function of the input set of color values.

24. An artificial intelligence model, as set forth in claim 23, wherein the artificial intelligence model is adapted to organize the plurality of color groups based on a plurality of test sets of color values.

25. An artificial intelligence model, as set forth in claim 23, wherein each of the plurality of color groups is associated with a formulation.

26. An artificial intelligence model, as set forth in claim 23, including a plurality of connections for connecting one of the plurality of output nodes to one of the plurality of input nodes.

27. An artificial intelligence model, as set forth in claim 26, including a weighted factor associated with each of the plurality of connections for selecting the one of the plurality of color groups as a function of one of the input set of color values.

28. An artificial intelligence model, as set forth in claim 27, including an output signal output by the output layer.

29. An artificial intelligence model, as set forth in claim 28, wherein the output signal is indicative of the one color group.

30. An artificial intelligence model, as set forth in claim 29, wherein each color group is associated with a formulation.

31. An artificial intelligence model, as set forth in claim 30, wherein the output signal is the formulation.

32. An artificial intelligence model, as set forth in claim 28, wherein the weighted factor is adjusted as a function of the output signal.

33. An artificial intelligence model, as set forth in claim 23, wherein the model is a neural network.

34. An artificial intelligence model, as set forth in claim 33, wherein the neural network is a self-organizing map neural network.

35. A computer system for providing a color solution to a customer, comprising:
a first module located at a remote location and being adapted to receive a solution request including color values from an operator; and
a second module coupled to the first module and being located at a central location, the second module including a composite solution database and a search routine coupled to the composite solution database, the composite solution database include a plurality of color groups, each color group containing one or more sets of color values and being associated with a color formulation, the second module being adapted to receive the solution request from the first module, to select one of the color groups as a function of the solution request and to responsively provide a proposed color solution, the proposed color solution being related to the color formulation associated with the selected color group; and,
an artificial intelligence cluster model coupled to the search routine for analyzing the proposed color solution.

36. A computer system for providing a color solution to a customer, comprising:
a first module located at a remote location and being adapted to receive a solution request including color values from an operator;
a second module coupled to the first module and being located at a central location, the second module including a composite solution database and a search routine coupled to the composite solution database and being adapted to receive the solution request from the first module and to provide a proposed color solution as a function of the solution request; and,
an artificial intelligence cluster model coupled to the search routine for analyzing the proposed color solution, wherein the proposed color solution is chosen from a plurality of color solutions and the artificial intelligence cluster model is adapted to determine if a new color solution is required.

37. A computer system for providing a color solution to a customer, comprising:
a first module located at a remote location and being adapted to receive a solution request including color values from an operator;
a second module coupled to the first module and being located at a central location, the second module including a composite solution database and a search routine coupled to the composite solution database and being adapted to receive the solution request from the first module and to provide a proposed color solution as a function of the solution request; and,
an artificial intelligence cluster model coupled to the search routine for analyzing the proposed color solution, wherein the artificial intelligence cluster model is adapted to determine if a new color solution should be published on another media.

38. A computer system for providing a color solution to a customer, comprising:
a first module located at a remote location and being adapted to receive a solution request including color values from an operator;
a second module coupled to the first module and being located at a central location, the second module including a composite solution database and a search routine coupled to the composite solution database and being adapted to receive the solution request from the first module and to provide a proposed color solution as a function of the solution request; and,
an artificial intelligence cluster model coupled to the search routine for analyzing the proposed color solution, wherein the artificial intelligence cluster model is adapted to determine is additional color samples are required.

39. A computer system for providing a color solution to a customer, comprising:
a first module located at a remote location and being adapted to receive a solution request including color values from an operator;
a second module coupled to the first module and being located at a central location, the second module including a composite solution database and a search routine coupled to the composite solution database and being adapted to receive the solution request from the first module and to provide a proposed color solution as a function of the solution request; and,
an artificial intelligence cluster model coupled to the search routine for analyzing the proposed color solution, wherein the artificial intelligence cluster model includes a plurality of color groups and a formulation associated with each color group, wherein the artificial intelligence model is adapted to select one of the plurality of color groups as a function of the solution request, and wherein the search routine is adapted for providing the proposed color solution as a function of a formulation associated with the one color group.

40. A computer system, as set forth in claim 35, wherein the artificial intelligence model is a neural network.

41. A computer system, as set forth in claim 40, wherein the artificial intelligence model is a self-organizing map neural network.

42. A method for organizing a plurality of sets of color values using an artificial intelligence cluster model, wherein the model includes an input layer having a plurality of input nodes and being adapted for receiving a plurality of sets of color values, an output layer coupled to the input layer and having a plurality of output nodes wherein one of the plurality of output nodes corresponds with one of the plurality of input nodes, wherein the artificial intelligence cluster model is adapted to organize the plurality of sets into a plurality of color groups, including the steps of:

providing the plurality of sets to the model; and organizing the plurality of sets into a plurality of color groups.

43. A method, as set forth in claim 42, including the step of matching an input set of color values with one of the plurality of color groups.

44. A method, as set forth in claim 42, wherein the model further comprises a plurality of connections for connecting one of the plurality of output nodes to one of the plurality of input nodes, the method including the step of applying a weighted factor to each of the plurality of connections for organizing the plurality of color groups based on a plurality of test sets of color values.

45. A method, as set forth in claim 44, including the step of matching an input set of color values with one of the plurality of color groups.

46. A method, as set forth in claim 45, including the step of producing an output signal.

47. A method, as set forth in claim 46, including the step of adjusting the weighted factor as a function of the output signal.

48. A method, as set forth in claim 42, including the step of training the artificial intelligence model for selecting one of the plurality of color groups as a function of an input set of color values.

49. A method, as set forth in claim 42, wherein the artificial intelligence model is a neural network.

50. A method, as set forth in claim 49, wherein the neural network is a self-organizing map neural network.

51. A method for organizing a plurality of sets of color values using a computer based model, the model being embodied in a neural network having an input layer and an output layer including a plurality of color groups, including the steps of:

providing the plurality of sets to the neural network; and organizing the plurality of sets into the plurality of color groups.

52. A method, as set forth in claim 51, including the step of matching an input set of color values with one of the plurality of color groups.

53. A method as set forth in claim 52, including the step of applying a weighted factor to select one of the plurality of color groups.

54. A method, as set forth in claim 53, including the step of producing an output signal.

55. A method, as set forth in claim 54, including the step of adjusting the weighted factor as a function of the output signal.

56. A computer-based method for providing a color solution to a customer over a computer network, including the steps of:

receiving a solution request, including an input set of color values, from an operator located at a remote location;

delivering the solution request from the remote location to a central location over the computer network;

searching a composite solution database and determining a proposed color solution as a function of the solution request; and, analyzing the proposed color solution using an artificial intelligence cluster model.

57. A computer-based method for providing a color solution to a customer over a computer network, including the steps of:

receiving a solution request, including an input set of color values, from an operator located at a remote location;

delivering the solution request from the remote location to a central location over the computer network;

searching a composite solution database and determining a proposed color solution as a function of the solution request;

analyzing the proposed color solution using an artificial intelligence cluster model;

choosing the proposed color solution from a plurality of color solutions; and, using the artificial intelligence cluster model to determine if a new color solution is required.

58. A computer-based method for providing a color solution to a customer over a computer network, including the steps of:

receiving a solution request, including an input set of color values, from an operator located at a remote location;

delivering the solution request from the remote location to a central location over the computer network;

searching a composite solution database and determining a proposed color solution as a function of the solution request;

analyzing the proposed color solution using an artificial intelligence cluster model; and using the artificial intelligence cluster model to determine if a new color solution should be published on another media.

59. A computer-based method for providing a color solution to a customer over a computer network, including the steps of:

receiving a solution request, including an input set of color values, from an operator located at a remote location;

delivering the solution request from the remote location to a central location over the computer network;

searching a composite solution database and determining a proposed color solution as a function of the solution request;

analyzing the proposed color solution using an artificial intelligence cluster model; and using the artificial intelligence cluster model to determine if additional color samples are required.

60. A computer-based method, as set forth in claim 56, wherein the artificial intelligence cluster model includes a plurality of color groups and a formulation associated with each color group and the method includes the steps of:

using the artificial intelligence cluster model to select one of the plurality of color groups as a function of the solution request; and, providing the proposed color solution as a function of a formulation associated with the one color group.

61. A computer-based method, as set forth in claim 56, including the step of producing an output signal indicative of the proposed color solution.

* * * * *